US012801286B2

(12) United States Patent
Kang et al.

(10) Patent No.: US 12,801,286 B2
(45) Date of Patent: Nov. 17, 2026

(54) METHODS FOR ESTIMATING CONSUMPTION OF STORAGE DEVICES, METHOD FOR DETECTING ABNORMAL WRITING IN STORAGE DEVICES AND EMBEDED SYSTEM USING THE SAME

(71) Applicant: LITE-ON TECHNOLOGY CORPORATION, Taipei City (TW)

(72) Inventors: Chung-Chia Kang, Taipei City (TW); Ming-Yi Liao, Taipei City (TW); Ssu Han Wang, Taipei City (TW)

(73) Assignee: LITE-ON TECHNOLOGY CORPORATION, Taipei City (TW)

( * ) Notice: Subject to any disclaimer, the term of this patent is extended or adjusted under 35 U.S.C. 154(b) by 0 days.

(21) Appl. No.: 19/036,491

(22) Filed: Jan. 24, 2025

(65) Prior Publication Data

US 2025/0383782 A1 Dec. 18, 2025

Related U.S. Application Data

(60) Provisional application No. 63/661,234, filed on Jun. 18, 2024.

(51) Int. Cl.
*G06F 3/06* (2006.01)

(52) U.S. Cl.
CPC .......... *G06F 3/0616* (2013.01); *G06F 3/0653* (2013.01); *G06F 3/0679* (2013.01)

(58) Field of Classification Search
CPC .... G06F 3/0616; G06F 3/0653; G06F 3/0652; G06F 3/064; G06F 3/0679; G11C 16/16; G11C 16/349
See application file for complete search history.

(56) References Cited

U.S. PATENT DOCUMENTS

| | | | | |
|---|---|---|---|---|
| 7,526,516 | B1 * | 4/2009 | Pavlyushchik | G06F 21/554 |
| 7,925,843 | B2 | 4/2011 | Ueno | |
| 8,352,835 | B2 * | 1/2013 | Zvibel | G06F 11/1004 714/768 |
| 9,665,481 | B2 | 5/2017 | Tan | |
| 9,727,473 | B2 * | 8/2017 | Dees | G06F 3/0659 |
| 10,180,875 | B2 | 1/2019 | Klein | |
| 2009/0089604 | A1 * | 4/2009 | Malik | G06F 1/28 713/340 |

(Continued)

FOREIGN PATENT DOCUMENTS

| | | | |
|---|---|---|---|
| CN | 111078439 | A | 4/2020 |
| CN | 108509143 | B | 11/2020 |

(Continued)

OTHER PUBLICATIONS

Kim et al. NPL: The Design and Implementation of Tripwire: A File System Integrity Checker; (Year: 1995).*

(Continued)

*Primary Examiner* — Tracy C Chan
(74) *Attorney, Agent, or Firm* — McClure, Qualey & Rodack, LLP

(57) ABSTRACT

The present invention implements a method for estimating the consumption of storage devices and a method for detecting abnormal writing in a storage device, by analyzing the file timestamps and using the checksum of the raw data in the partition of the storage device. An embedded system applying the aforementioned methods is also provided.

14 Claims, 6 Drawing Sheets

(56) References Cited

U.S. PATENT DOCUMENTS

| | | | | |
|---|---|---|---|---|
| 2017/0031414 | A1* | 2/2017 | Matsuo | H04L 67/303 |
| 2019/0303239 | A1* | 10/2019 | Hsiao | G06F 12/0246 |
| 2022/0300184 | A1* | 9/2022 | Yang | G11C 16/16 |

FOREIGN PATENT DOCUMENTS

| | | | |
|---|---|---|---|
| CN | 113515448 | A | 10/2021 |
| CN | 110928890 | B | 1/2023 |
| CN | 111324284 | B | 2/2024 |
| TW | I381383 | B | 1/2013 |
| TW | I423005 | B | 1/2014 |
| TW | I661427 | B | 6/2019 |
| TW | I797742 | B | 4/2023 |

OTHER PUBLICATIONS

Chinese language office action dated May 2, 2025, issued in application No. TW 113143560.

* cited by examiner

METHODS FOR ESTIMATING CONSUMPTION OF STORAGE DEVICES, METHOD FOR DETECTING ABNORMAL WRITING IN STORAGE DEVICES AND EMBEDED SYSTEM USING THE SAME

CROSS REFERENCE TO RELATED APPLICATIONS

This application claims the benefit of U.S. Provisional Application No. 63/661,234 filed Jun. 18, 2024, the entirety of which is incorporated by reference herein.

BACKGROUND OF THE INVENTION

Field of the Invention

The present invention relates to the storage devices, and, in particular, it relates to a method for estimating consumption of storage devices, a method for detecting abnormal writing in storage devices, and an embedded system using the aforementioned methods.

Description of the Related Art

Embedded systems can be applied to various products, such as Wireless Access Points (Wireless APs), Routers, Mesh Network Devices, IoT (Internet of Thing) Gateways, IoT Devices, IP Cameras and other network infrastructure and embedded IoT devices.

When an embedded system is applied in any of the aforementioned products, flash memory is often installed therein for use as a storage device. The flash memory has a limited lifespan (or service life); that is, it has limited program-erase cycles (P/E cycles). Typically, the lifespan or program-erase cycle of a flash memory is about 50,000 to 100,000 iterations. When the number of program-erase cycles exceeds the manufacturer's warranty period (for example, more than 100,000 program-erase cycles), the reliability and performance of the flash memory cannot be guaranteed. The embedded system may fail to write data to, and read data from, the flash memory, causing the embedded system to fail. For example, if the flash memory of a home Wi-Fi AP has exhausted its program-erase cycle or lifespan, the Wi-Fi AP may not successfully load the configuration data or program to perform functions even when it has been turned on. In this case, the Wi-Fi AP must be sent out to be repaired or replaced with a new one.

When manufacturers develop a system, unless the system parameter settings need to be updated or modified, the designers try to prevent writing to the storage device (flash memory) as much as possible, to avoid high-frequency writing. However, the functional designs of modern embedded systems are more diverse and complex. In addition to the parameters, some special data of the embedded system may need to be backed up regularly, such as system logs, client sessions, etc. If backup cycles are not carefully calculated or programming errors occur, the lifespan of the storage device (flash memory) may be unexpectedly exhausted, causing premature system failure.

Consequently, for storage devices, if the consumption (that is, the wearing-down of storage devices due to programing and erasing) of the storage devices can be estimated in advance and abnormal writing to storage devices can be detected, the service lifespan of these storage devices and their embedded systems can be extended.

BRIEF SUMMARY OF THE INVENTION

Accordingly, the present invention implements a method for estimating consumption of a storage device and a method for detecting abnormal writing in a storage device. It does this by analyzing the timestamp of files in the storage device and using the checksum of raw data in the partition of the storage device. An embedded system applying the aforementioned methods is also provided.

One embodiment of the present invention provides a method for estimating consumption of a storage device. The method comprises the following steps. At every first time interval, the timestamps of all files in the storage device are periodically checked and obtained. During each check of the timestamps, the method performs the following steps. The method determines the timestamps of the currently obtained files which are later than the time of a previous check. The method outputs the relevant information of all newer files, in the currently obtained files, to a file list, wherein the newer files have timestamps later than the time of the previous check. The method continues to periodically check at a second time interval. The method obtains statistics of expected writing to the storage device within the second time interval. It should be noted that the second time interval is longer than the first time interval.

According to one aspect of the embodiment, before checking and obtaining the timestamps of all files in the storage device, the method is configured to obtain a checksum of raw data in a partition of the storage device first, and then to determine whether the checksum has changed. The method further checks and obtains the timestamps of all files in the storage device when determining that the checksum has changed.

According to some aspects of the embodiment, the method further includes the following steps. The raw data currently obtained is compared with the raw data previously obtained. All file paths which have been changed are obtained. The number of file paths that have been changed is obtained.

According to some aspects of the embodiment, the number of newer files corresponds to the write count of the storage device in each of the first time intervals. The method further comprises the following steps. The relevant information of all the newer files whose timestamps are later than the time of the previous check in the file list is checked. A determination is made as to whether they are the files to be written expectedly. Those files which are determined to have been written unexpectedly are excluded from the total of the write count.

According to some aspects of the embodiment, the number of newer files corresponds to the write count of the storage device in each of the first time intervals. The method further comprises the following steps. All the file paths that have been changed are checked to determine whether they reflect the expected writing actions. Those file paths that do not reflect expected writing actions are excluded from the total of the write count.

According to some aspects of the embodiment, when determining that the checksum has changed but the timestamps of all the files currently obtained are not later than the time of the previous check, the first time interval is shortened.

According to some aspects of the embodiment, the storage device is flash memory.

Another embodiment of the present invention provides a method for detecting abnormal writing in a storage device. At every first time interval, the method includes obtaining the checksum of raw data in a partition of the storage device, and determining whether the checksum has changed. The method comprises checking further and obtaining the timestamps of all files in the storage device when the checksum is determined to have changed. During each check of the timestamps, the method further includes the following steps. The timestamps of the currently obtained files (which are later than the time of a previous check) are determined. The relevant information of all newer files in the currently obtained files is output to a file list, wherein the newer files have timestamps later than the time of the previous check. The periodic check continues for a second time interval. The statistics of expected writing to the storage device within the second time interval are obtained. It should be noted that the second time interval is longer than the first time interval.

According to some aspects of the other embodiment, when determining that the checksum has changed but the timestamps of all the files obtained are not later than the time of the previous check, the first time interval is shortened.

According to some aspects of the other embodiment, the method further includes the following steps. The method further includes checking the relevant information of all the newer files whose timestamps are later than the time of the previous check in the file list. The method further includes determining whether they are the files that have been written abnormally (unexpectedly).

According to some aspects of the other embodiment, the method further includes the following steps. The raw data currently obtained is compared with the raw data previously obtained. All file paths which have been changed are obtained. All the file paths that have been changed are checked to determine whether they reflect expected writing actions. Those file paths that do not reflect expected writing actions are detected as abnormal (unexpected) writing.

Another embodiment of the present invention provides an embedded system that includes a storage device and a controller. The storage device is configured to store a firmware, a program, and configuration data. The controller is configured to load the firmware or program and to perform operations for periodically checking and obtaining the timestamps of all files in the storage device at every first time interval. During each check of the timestamps, the controller performs the following steps. The controller determines the timestamps of the currently obtained files which are later than the time of a previous check. The controller outputs the relevant information of all newer files in the currently obtained files to a file list, wherein the newer files have timestamps later than the time of the previous check. The controller continues periodically checking at a second time interval. The controller obtains the statistics of the expected writing to the storage device within the second time interval. It should be noted that the second time interval is longer than the first time interval.

According to some aspects of the other embodiment, before checking and obtaining the timestamps of all files in the storage device, the controller of the embedded system obtains the checksum of raw data in a partition of the storage device first, and determines whether the checksum has changed. When the controller determines that the checksum has changed, the controller further checks and obtains the timestamps of all files in the storage device to estimate consumption of the storage device.

In addition, the controller is further configured to compare the raw data currently obtained with the raw data previously obtained, and to obtain all file paths which have been changed, as well as to obtain the number of file paths that have been changed. Furthermore, the number of newer files corresponds to the write count of the storage device in each of the first time intervals. The controller further checks all the file paths which have been changed to determine whether they reflect expected writing actions. The controller excludes those file paths that do not reflect expected writing actions from the total of the write count.

According to some aspects of the other embodiment, the number of newer files corresponds to the write count of the storage device in each of the first time intervals. The controller further checks the relevant information of all the newer files whose timestamps are later than the time of the previous check in the file list, and determines whether they are the files which are determined to have been written expectedly. The controller excludes those files determined to have been written unexpectedly from the total of the write count.

According to some aspects of the other embodiment, the number of newer files corresponds to the write count of the storage device in each of the first time intervals. In addition, the controller further checks all the file paths which have been changed to determine whether they reflect expected writing actions; and for the file paths not reflecting expected writing actions, the controller excludes them from the total of the write count.

According to some aspects of the other embodiment, when determining that the checksum has changed but the timestamps of all the files currently obtained are not later than the time of the previous check, the controller of the embedded system shortens the first time interval.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

In order to make the aforementioned objects, features and advantages of the present invention more obvious and easier to understand, the following is a detailed description of the preferred embodiments and the accompanying drawings. The following description is made for the purpose of illustrating the general principles of the invention and should not be taken in a limiting sense. The scope of the invention is best determined by reference to the appended claims.

Figure 1:
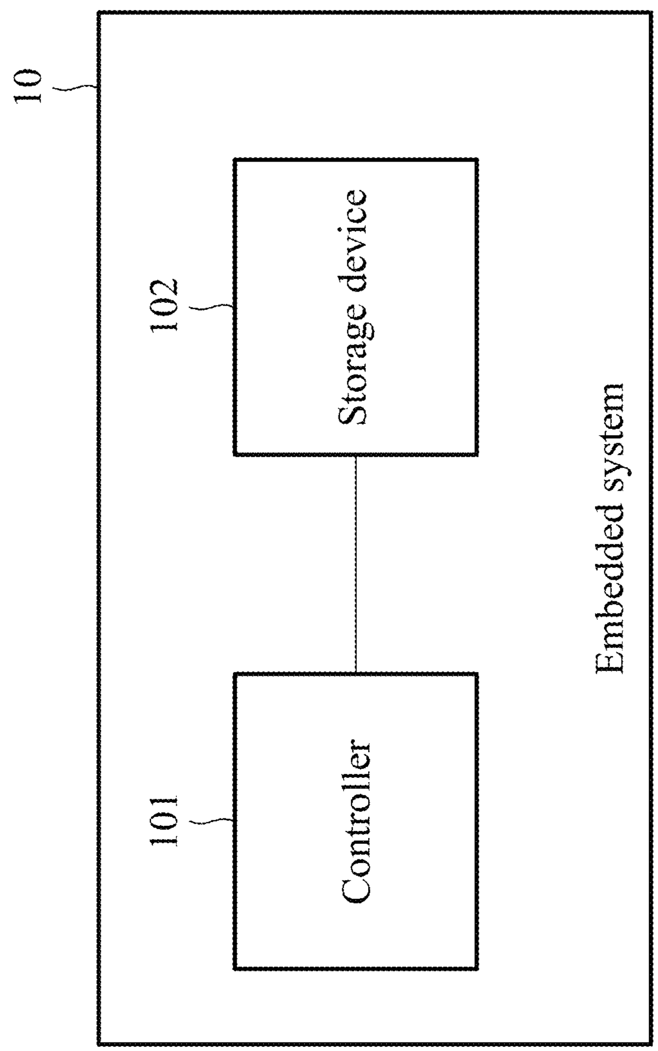
FIG. 1 is a block diagram of an embedded system according to the present invention.

FIG. 1 is a block diagram of an embedded system according to the present invention.

The embedded system 10 includes a storage device 101 and a controller 102. The storage device 101 is configured to store firmware, programs, and configuration data. The controller 102 is configured to load the aforementioned firmware or programs, and to execute the method for estimating consumption of the storage device and the method for detecting abnormal writing of the storage device, which are described later.

In this embodiment, the embedded system 10 is applied to, for example, a wireless access point (wireless AP), a router, a mesh network device, an IoT gateway, an IoT device, an IP camera, or another network infrastructure or embedded IoT device. The aforementioned storage device may be a flash memory.

Figure 2:
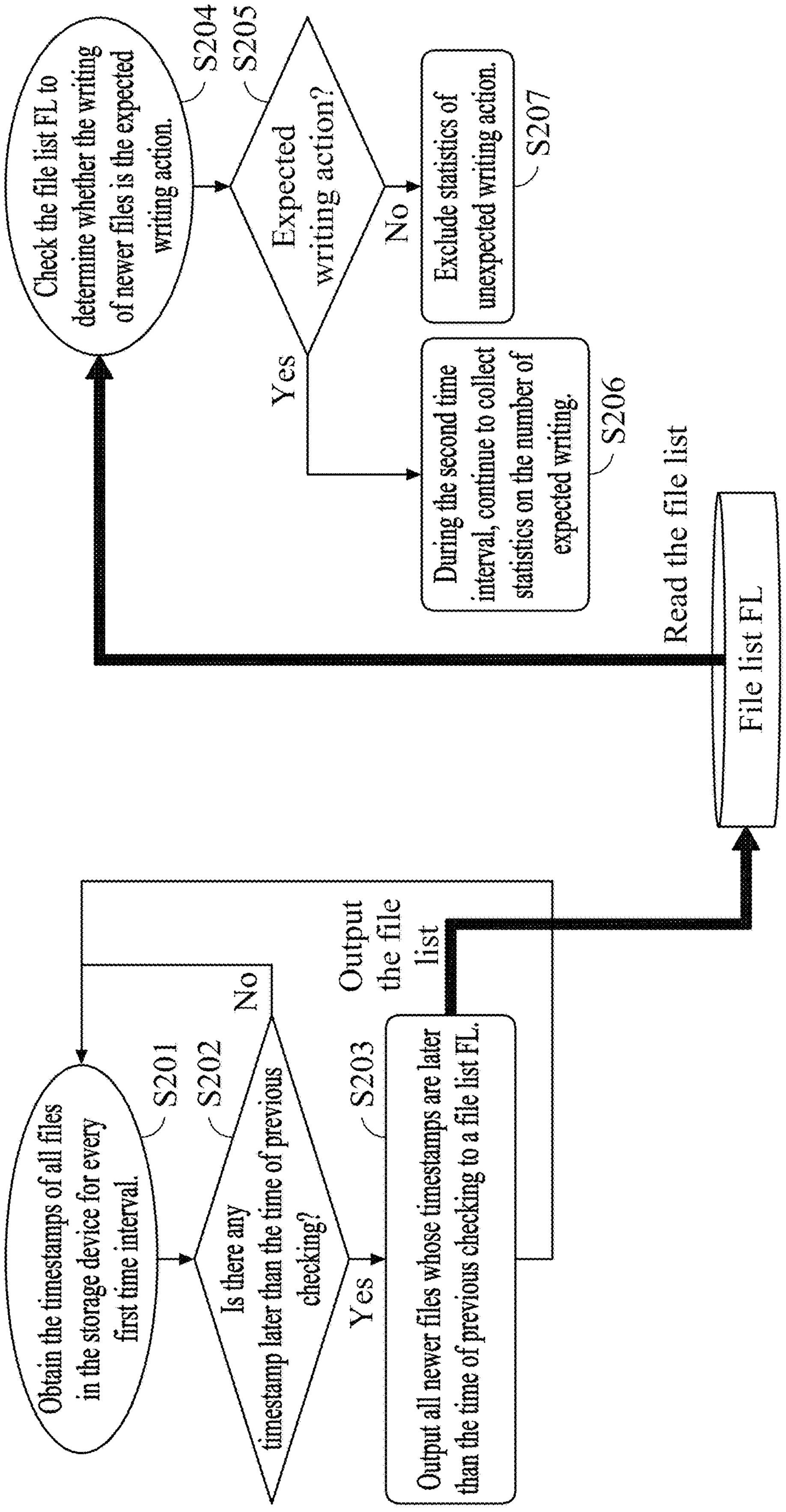
FIG. 2 is a schematic flow chart of a method for estimating consumption of a storage device according to one embodiment of the present invention.

FIG. 2 is a schematic flow chart of the method for estimating consumption (writing wear) of a storage device according to an embodiment of the present invention. The method for estimating consumption of the storage device 101 is executed after the controller 102 of the embedded system 10 loads a program (or firmware). The method for estimating consumption of the storage device 101 according to the present invention is described below with reference to FIG. 2.

The controller 102 performs the following operations after loading the program. First, at every first time interval (for example, several seconds to several minutes, but not limited thereto), the controller 102 periodically checks and obtains the timestamps of all files in the storage device 101 (step S201). Next, in each check of the timestamps, the controller 102 determines whether there is any timestamp later than the time of the previous check among all the file timestamps currently obtained (step S202); that is, whether there is any newer file which has been created or written in. If there is any newer file (step S202: Yes), the controller 102 executes step S203; if there is no newer file (step S202: No), the controller 102 returns to step S201. Afterwards, the controller 102 outputs the relevant information of all newer files among the currently obtained files whose timestamps are later than the time of the previous check to a file list FL and returns to step S201.

The content of the file list FL may include, for example, a file path (such as a related path in a program code, etc.), a file timestamp, the number of writings within the first time interval, and a writing frequency, etc. Next, analyzing and debugging operations are performed using the various content of the file list FL. The controller 102 of the embedded system 10 can perform these operations to directly analyze the files, or to output the file list FL to an external device (such as an external server, etc.) for further analysis. For example, in this embodiment, the controller 102 performs an analysis and other operations, but the present invention is not limited thereto.

In step S204, the controller 102 begins to analyze, reads the file list FL, and checks the relevant paths in the program code to determine whether the writing of each newer file is an expected (not abnormal) writing action. By examining the relevant paths in the program code, if the writing action is based on the original design of the system developer or the user's self-defined design, it is considered as "expected writing". Conversely, if the writing action is caused by an unknown source such as a program error (bug) or a virus, it is regarded as "unexpected (abnormal) writing".

When it is determined that the writing action is expected (step S205: Yes), the controller 102 executes step S206. The number (count) of expected writing is accumulated (counted) in step S206. If it is determined that the writing action is unexpected (step S205: No), the controller 102 executes step S207 to exclude counting of the unexpected writing action from statistics.

In step S206, the number of expected writings is continuously counted. In other words, the controller 102 continues the periodic detection for the first time interval, and in step S206, the controller 102 counts the total number of writings to the storage device 101, and writing frequency, etc. within a second time interval. For example, the second time interval may be three days, one week, or one month. Through the total number of writings and the writing frequency counted in step S206, the possible future consumption (in proportion to the number of writings) of the storage device (flash memory) 101 over the subsequent one or more years (for example, three to ten years) can be estimated as a design reference for testing and debugging the embedded system.

In addition, even if the writing action is an expected event, if the frequency of writing to the storage device is too high, it is still possible for the flash memory (storage device) to become damaged in the future. For example, suppose a file is found to be updated or written to the flash memory once every day: each updating and writing iteration is equivalent, in terms of wear and tear, to one iteration of erasing and writing the entire partition of the flash memory. Using the same frequency, the number of times flash memory is written to in five years is 5×365=1825, which does not seem to be a big risk. However, if multiple files (for example, 50 files) with a similar writing frequency are observed, or some files written at a higher writing frequency are observed (basically, if data is written to the flash memory at a high frequency, such as one write process every half hour), there will be nearly 100,000 writing iterations within five years, and the risk of exhausting the lifespan of the flash memory increases greatly. According to the method for estimating consumption of a storage device in this embodiment, the number of times the storage device is written to, or the writing frequency in each short term (such as the first time interval), can be collected over the long term (such as the second time interval). Thereby, the consumption of the storage device (flash memory) as measured in years (for example, three to ten years) can be estimated and used as a reference for system developers to test and debug programs.

In the embodiment of FIG. 2, it is assumed that the checking interval (the first time interval) of the controller 102 is every one minute. If an expected or unexpected file is created or written, then the file is deleted within one minute, and the controller 102 may fail to detect the file being written and obtain its file timestamp, thereby missing such high-frequency writing consumption.

When files in the flash memory are deleted, unless they are erased, only the file indexes will be deleted. The data still remain in the flash memory, and the checksum of the raw data in the partition will be changed definitely. Therefore, another embodiment of the present invention mainly utilizes the characteristics of the checksum of the raw data in the partition of the storage device (flash memory) to detect the writing that cannot be detected through the file timestamps, to the flash memory.

Figure 5A:
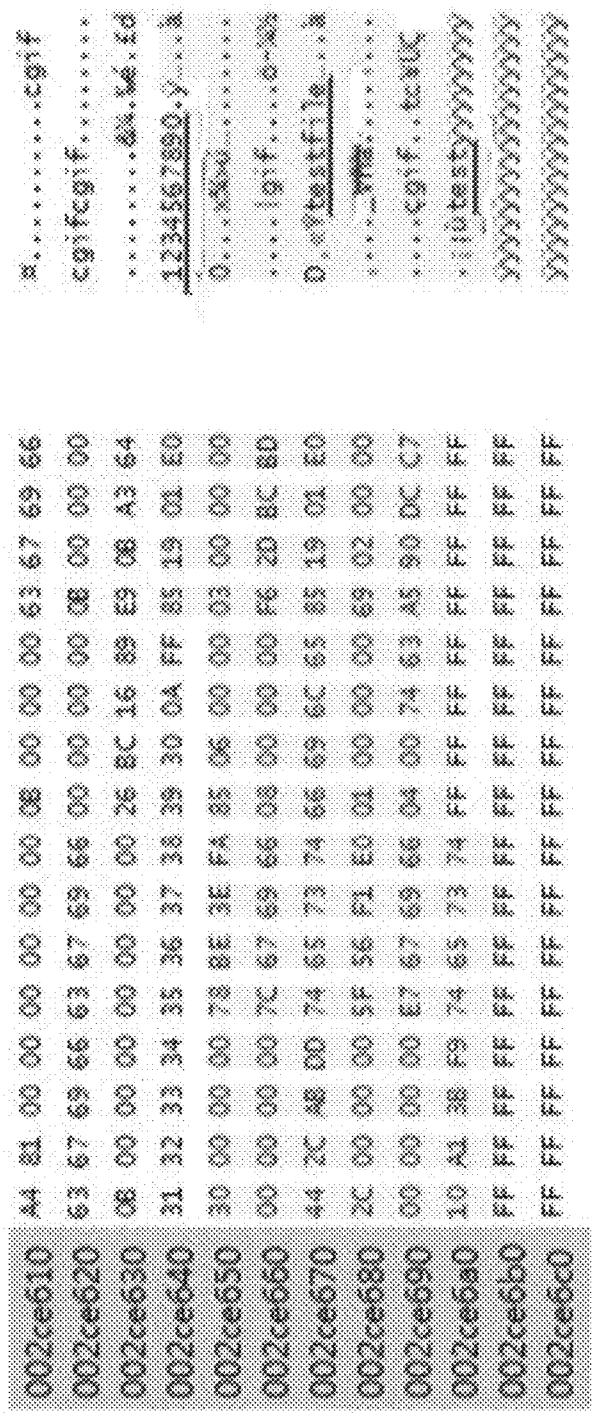
FIG. 5A shows an example of raw data in a partition of a flash memory.
Figure 5B:
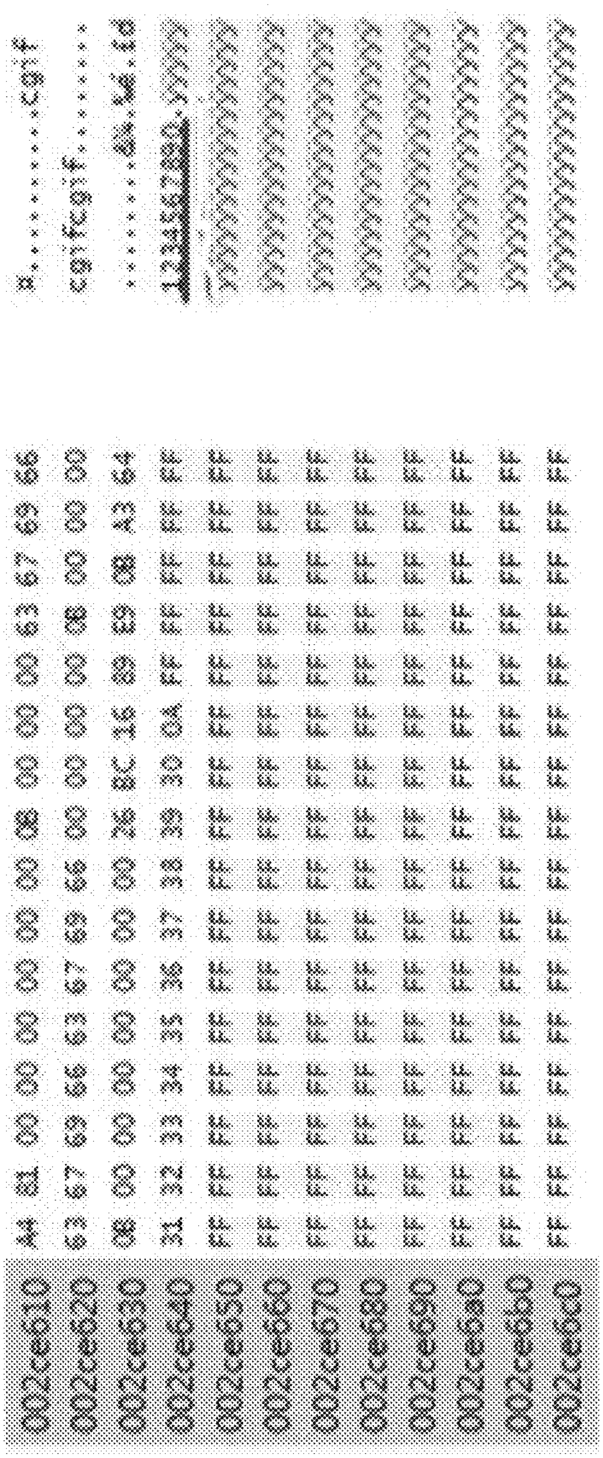
FIG. 5B shows an example of raw data in a partition of a flash memory after deleting files in the flash memory.

In addition, the controller 102 may use, for example, a "hexdump" tool to inspect the content of the raw data in the partition, and find the file content or file paths that were once created but later deleted. FIG. 5A shows an example of raw data in the partition of a flash memory. In FIG. 5A, in the ASCII code section, a text file with the content "1234567890" stored in the path "/test/testfile" can be found. FIG. 5B shows an example of the raw data in the partition of a flash memory after deleting a file. In FIG. 5B, after deleting the file, the index data such as "/test/testfile" is deleted, but the file content "1234567890" still remains. Therefore, by comparing the raw data before and after deleting the file, it is still possible to find the content of a file that was once created but then deleted. In addition, if the file index data is not completely deleted, the file path may be viewed directly. If the index data has been deleted, the file path can still be obtained by comparing the program code.

Figure 3:
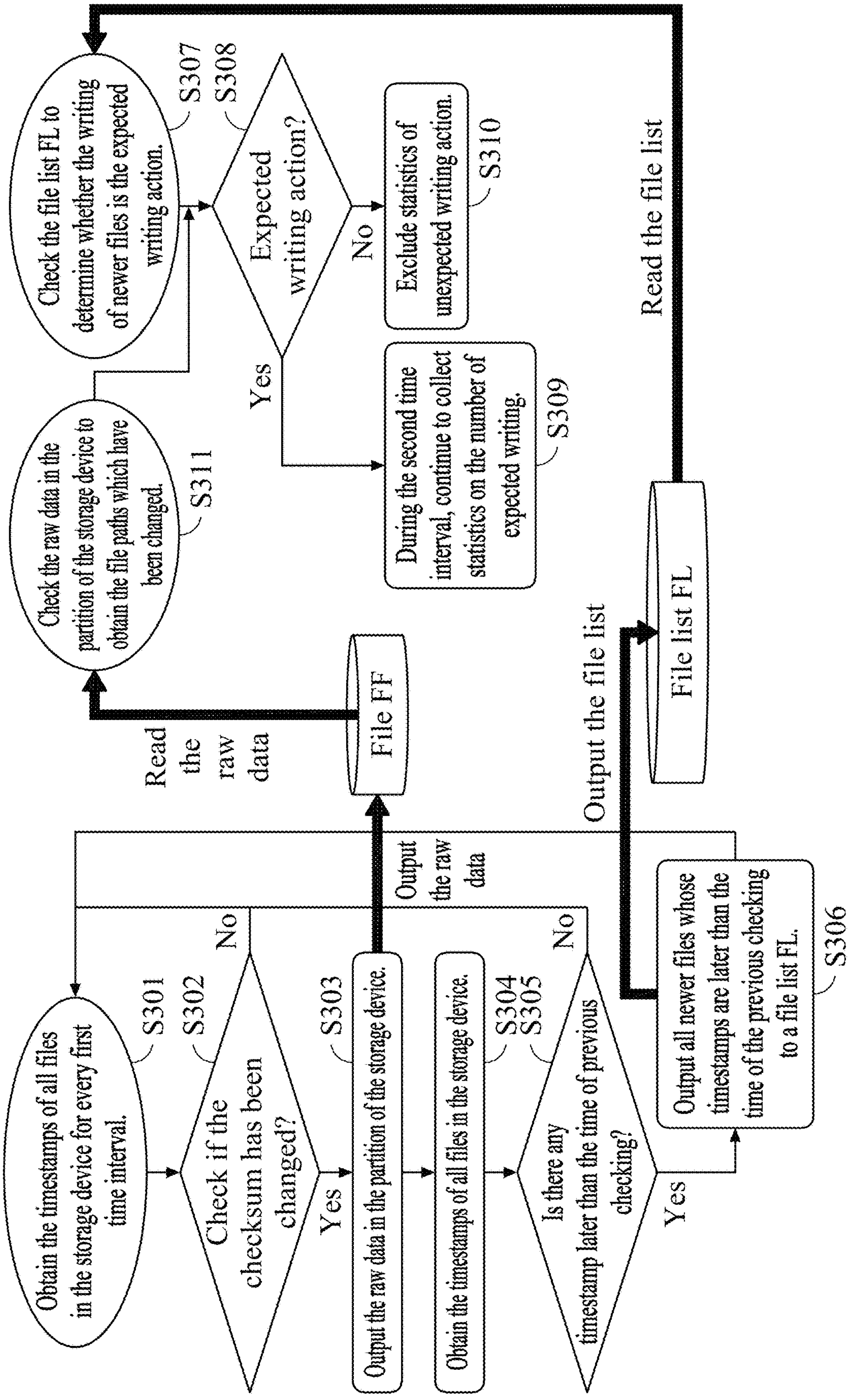
FIG. 3 is a schematic flow chart of a method for estimating consumption of a storage device according to another embodiment of the present invention.

FIG. 3 is a schematic flow chart of a method for estimating consumption of a storage device according to another embodiment of the present invention. Similarly, after the controller 102 of the embedded system 10 (in FIG. 1) loads a program (or firmware), the controller 102 performs the method for estimating consumption of the storage device. Referring to FIG. 3, the method for estimating the consumption of the storage device according to the present invention is explained.

After the controller 102 loads the program, it performs the following operations. First, for every first time interval (for example, several seconds to a few minutes, but not limited to this), the controller 102 obtains the checksum of the raw data in the partition of the storage device (Flash memory) 101 (step S301), and further checks whether the checksum has changed (step S302). When the controller 102 determines that the checksum has changed (step S302: Yes), the raw data in the partition of the storage device 101 are output (step S303), and the process flow proceeds to step S304. In step S303, the controller 102 may output the raw data in the partition to a file FF, where the raw data may include file indexes, file contents, etc. When the controller 102 determines that the checksum has not changed (step S302: No), the process flow returns to step S301.

In step S304, the controller 102 checks and obtains the timestamps of all files in the storage device 101. Then, the controller 102 determines whether any of the timestamps obtained at the current time are later than the timestamps obtained from the previous check (step S305); that is, whether any newer files have been created or written. If there are newer files (step S305: Yes), the controller 102 performs step S306. If there is no newer file (step S305: No), the controller 102 returns to step S301. In step S306, the controller 102 outputs the relevant information of all newer files, whose timestamps are later than those obtained from the previous check, to a file list FL and then the process flow returns to step S301.

Next, the content in the file FF and the file list FL output by the embedded system 10 may be used to perform analysis and debugging operations. Such analysis operations can be performed by the controller 102 of the embedded system 10 to directly analyze the file FF and the file list FL, or by an external device which receives the file FF and the file list FL output from controller for further analysis. For example, in this embodiment, the analysis and other operations are performed by the controller, but the present invention is not limited thereto.

In step S307, the controller 102 reads the file list FL and checks information of the relevant paths in the program code to determine whether the writing of each newer file is an expected (not abnormal) action. As described in the embodiment of FIG. 2, by examining the relevant paths in the program code, if the writing action is based on the original design of the system developer or the self-defined design of the user, it is considered as "expected writing". Conversely, if the writing action is caused by an unknown source such as a program error (bug) or a virus, it is considered as "unexpected (abnormal) writing".

When the writing action is determined to be expected (step S308: Yes), the controller 102 then performs step S309. The number of expected writing actions will be accumulated and counted in step S309. If the writing action is determined to be unexpected (step S308: No), the controller 102 then performs step S310 to exclude the unexpected writing action from the statistics.

In step S311, the controller 102 reads the file FF and checks the raw data in the partition of the storage device 101 to obtain the file path that has been changed (deleted). Here, the controller 102, for example, obtains all the changed file paths by comparing the current raw data with the previous raw data, and further obtains the number of changed file paths. Regarding obtaining the file path, if the file index data is not completely deleted, the controller 102 can directly check the file path. If the index data has been deleted, the controller 102 can still further learn the file path by comparing the program code. Next, in step S308, it should be noted that the controller 102 determines whether the writing operation accurately reflects an expected writing action by checking the obtained file path. If the writing operation is determined not to reflect the expected writing action, it is excluded from the total number of writings (step S310). If the writing operation is determined to reflect the expected writing action, it is counted in the total number of writings (step S309).

Using the method described in the embodiment of FIG. 3, it is possible to avoid missing the detection of files that are written and then deleted within a short period of time. In addition, it is worth noting that the method of this embodiment can be further designed such that when the controller 102 confirms that the checksum has changed, but the timestamps of all the files obtained do not have any timestamp later than the time of the previous check, the controller 102 may shorten the first time interval to avoid missing the detection of a file that is written and then deleted within a short period of time.

Figure 4:
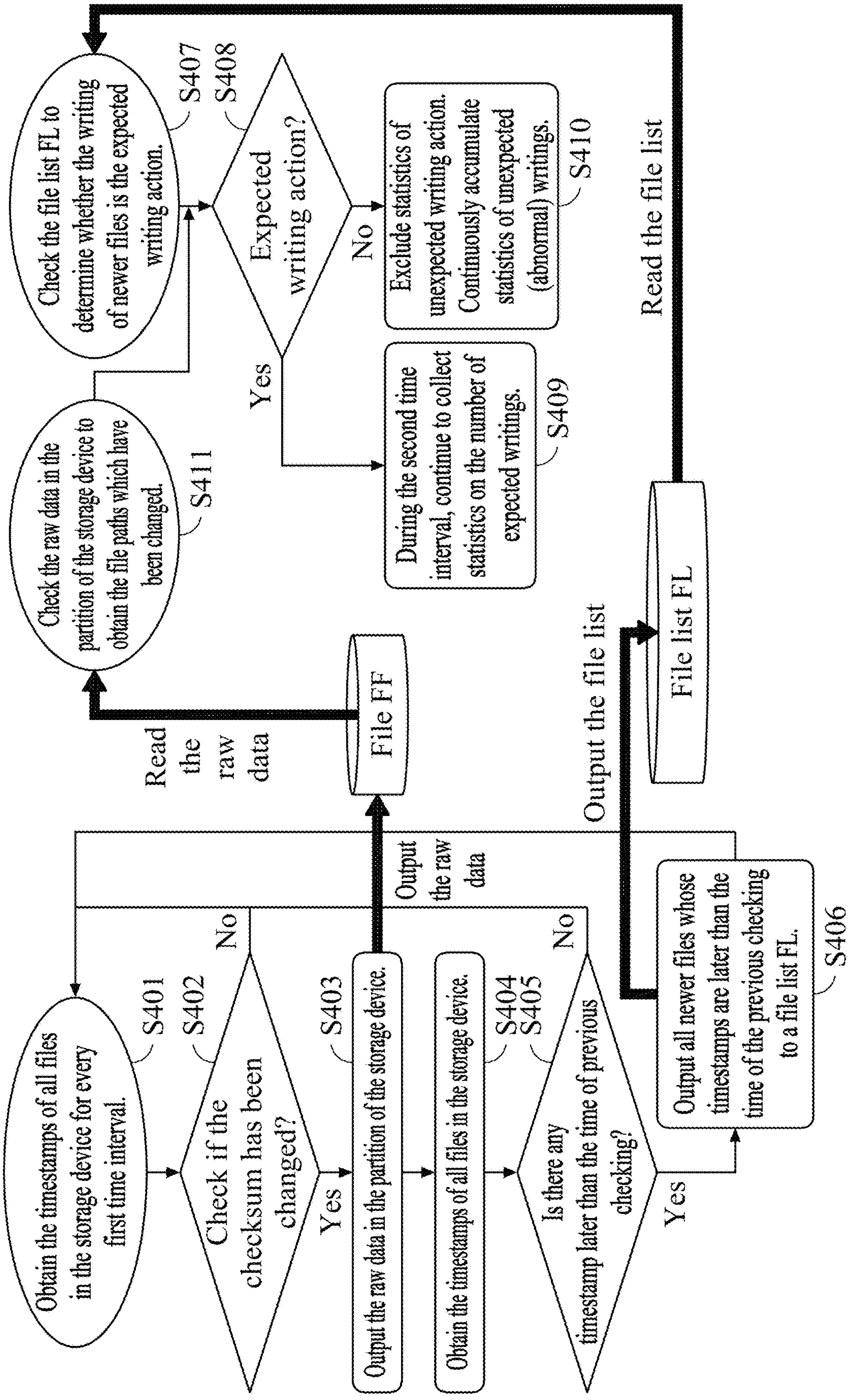
FIG. 4 is a schematic flow chart of a method for detecting abnormal writing according to another embodiment of the present invention.

In addition, the present invention further provides a method for detecting abnormal writing suitable for a storage device such as flash memory. FIG. 4 is a schematic flow chart of a method for detecting abnormal writing according to another embodiment of the present invention. The following is the corresponding description in view of FIG. 4.

The method for detecting abnormal writing according to the embodiment of FIG. 4 includes the following operations. First, the controller 102 obtains the checksum of the raw data in the partition of the storage device (flash memory) 101 at every first time interval (step S401), and confirms whether the checksum has changed (step S402). When the controller 102 confirms that the checksum has changed (step S402: Yes), the controller outputs the raw data in the partition of the storage device 101 to the file FF (step S403), and further checks and obtains the timestamps of all files in the storage device (step S404). In addition, when the controller 102 confirms that the checksum has not changed (step S402: No), the process flow returns to step S401.

Please note that when the controller 102 confirms that the checksum has changed, but the timestamps of all the files obtained do not have a timestamp later than the time of the previous check, the process flow returns to step S401 and shortens the first time.

Next, the controller 102 checks whether there is a timestamp among the timestamps of all files currently obtained which is later than the time of the previous check (step S405); that is, whether a newer file has been generated or written. If there is a newer file (step S405: Yes), the controller 102 performs step S406. If there is no newer file (step S405: No), the controller 102 performs step S401. In step S406, the controller 102 outputs the relevant information of all newer files in the currently obtained files to a file list FL, and returns to step S401. The newer files have timestamps later than the time of the previous check.

Next, the file FF generated by the embedded system 10 and the various contents in the file list FL are used to perform detection of abnormal writing. In this operation, the controller 102 of the embedded system 10 can directly analyze the file FF and the file list FL, or the controller 102 can output the file FF and the file list FL to an external device for further analysis. For example, in this embodiment, the controller 102 performs analysis and other operations, but the present invention is not limited thereto.

In step S407, the controller 102 reads the file list FL and checks data such as the relevant paths in the program code to determine whether the writing of each newer file is an expected (non-abnormal) writing action. For example, by examining the relevant paths in the program code, if the writing action is based on the original design of the system developer or the design defined by the user, it is considered as "expected writing". Conversely, if the analysis shows that the writing action is caused by an unknown source such as a program error (bug) or a virus, it is regarded as "unexpected (abnormal) writing".

When the controller 102 determines that the writing action is unexpected (step S408: No), the unexpected (abnormal) writing statistics can be continuously accumulated (step S410), and the controller 102 can send a message to notify the user, or returns the statistics to the manufacturer's research and development personnel.

In addition, in step S411, the controller 102 reads the file FF and checks the raw data in the partition of the storage device 101 to obtain the file paths which is changed (deleted). Here, the controller 102 obtains all the changed file paths, for example, by comparing the current raw data with the previous raw data, and further obtains the number of changed file paths. Next, in step S408, it should be noted that the controller 102 checks the obtained file path to determine whether it reflects the expected writing action. When the controller 102 determines that the writing action is unexpected (step S408: No), the statistics of unexpected (abnormal) writing can be continuously accumulated (step S410), and the controller 102 can send a message to notify the user, or send the statistics back to the manufacturer's research and development personnel. If the number of unexpected writing statistics is too high, the research and development personnel or users can review whether the system or program settings need to be adjusted or updated.

In addition, after being processed by step S407 or step S411, if the writing action is further determined as an expected write in step S408, the writing action will be counted in the statistics of the total number of writing (step S409).

As can be seen from the above, by analyzing the timestamps of the files in the storage device and using the checksum characteristics of the raw data in the partition of the storage device, the present invention implements the method for estimating the consumption of a storage device, and the method for detecting the abnormal writing in the storage device. At the same time, embedded systems using the above methods are also provided to extend the lifespan of the storage device (flash memory) and enhance the performance of the embedded system.

Although the present invention is disclosed as above with preferred embodiments, it is not intended to limit the scope of the present invention. Any person having ordinary skill in the art can make some changes and modifications without departing from the spirit and scope of the present invention. Therefore, the protection scope of the present invention shall be determined by the scope of the attached patent claims.

What is claimed is:

1. A method for estimating consumption of a storage device, comprising:

at every first time interval, periodically checking and obtaining timestamps of all files in the storage device;

during each check, performing the steps of:

determining which timestamps of the currently obtained files which are later than the time of a previous check;

outputting the relevant information of all newer files in the currently obtained files to a file list, the newer files having timestamps later than the time of the previous check; and continuing the periodic checking at a second time interval, and obtaining statistics of expected writing to the storage device within the second time interval;

wherein the second time interval is longer than the first time interval;

wherein before checking and obtaining the timestamps of all files in the storage device, obtaining a checksum of raw data in a partition of the storage device first, and determining whether the checksum has changed; and further checking and obtaining the timestamps of all files in the storage device upon determining that the checksum has changed;

wherein when determining that the checksum has changed but the timestamps of all the files currently obtained are not later than the time of the previous check, the first time interval is shortened.

2. The method as claimed in claim 1, further comprising the steps of:

comparing the raw data currently obtained with the raw data previously obtained, and obtaining all file paths which have been changed; and obtaining the number of file paths that have been changed.

3. The method as claimed in claim 1, wherein the number of newer files corresponds to the write count of the storage device in each of the first time intervals;

the method further comprising the steps of:

checking the relevant information of all the newer files whose timestamps are later than the time of the previous check in the file list, and determining whether they are the files to be written expectedly; and for the files which are determined to have been written unexpectedly, excluding them from the total of the write count.

4. The method as claimed in claim 2, wherein the number of newer files corresponds to the write count of the storage device in each of the first time intervals;

the method further comprising the steps of:

checking all the file paths that have been changed to determine whether they reflect expected writing actions;

for the file paths not reflecting expected writing actions, excluding them from the total of the write count.

5. The method as claimed in claim 1, wherein the storage device is flash memory.

6. An embedded system, comprising:

a storage device configured to store a firmware, a program, and configuration data;

a controller configured to load the firmware or program and to perform the operations of periodically checking and obtaining timestamps of all files in the storage device, for every first time interval;

during each check, the controller performs the steps of:

determining which timestamps of the currently obtained files which are later than the time of a previous check;

outputting the relevant information of all newer files in the currently obtained files to a file list, the newer files having timestamps later than the time of the previous check;

continuing the periodic checking for a second time interval, and obtaining the statistics of expected writing to the storage device within the second time interval;

wherein the second time interval is longer than the first time interval;

wherein before checking and obtaining the timestamps of all files in the storage device, the controller obtains a checksum of raw data in a partition of the storage device first, and determines whether the checksum has changed; and upon determining that the checksum has changed, the controller further checks and obtains the timestamps of all files in the storage device to estimate consumption of the storage device;

wherein when determining that the checksum has changed but the timestamps of all the files currently obtained are not later than the time of the previous check, the controller shortens the first time interval.

7. The embedded system as claimed in claim 6, wherein the controller is further configured to:

compare the raw data currently obtained with the raw data previously obtained, and obtain all file paths which have been changed; and obtain the number of file paths that have been changed.

8. The embedded system as claimed in claim 6, wherein the number of newer files corresponds to the write count of the storage device in each of the first time intervals; and the controller is further configured to:

check the relevant information of all the newer files whose timestamps are later than the time of the previous check in the file list, and determine whether they are the files which are determined to have been written expectedly; and for the files determined to have been written unexpectedly, exclude them from the total of the write count.

9. The embedded system as claimed in claim 7, wherein the number of newer files corresponds to the write count of the storage device in each of the first time intervals;

the controller is further configured to:

check all the file paths that have been changed to determine whether they reflect expected writing actions; and for the file paths not reflecting expected writing actions, exclude them from the total of the write count.

10. The embedded system as claimed in claim 6, wherein the storage device is flash memory.

11. A method for detecting abnormal writing in a storage device, comprising:

for every first time interval, obtaining a checksum of raw data in a partition of the storage device, and determining whether the checksum has changed;

further checking and obtaining the timestamps of all files in the storage device upon the checksum is determined to have changed;

during each check of the timestamps, performing the steps of:

determining which timestamps of the currently obtained files which are later than the time of a previous check;

outputting the relevant information of all newer files in the currently obtained files to a file list, the newer files having timestamps later than the time of the previous check;

continuing the periodic checking for a second time interval, and obtaining statistics of expected writing to the storage device within the second time interval;

wherein the second time interval is longer than the first time interval;

wherein when determining that the checksum has changed but the timestamps of all the files obtained are not later than the time of the previous check, the first time interval is shortened.

12. The method as claimed in claim 11, further comprising the steps of:

checking the relevant information of all the newer files whose timestamps are later than the time of the previous check in the file list; and determining whether they are the files that have been written abnormally (unexpectedly).

13. The method as claimed in claim 11, further comprising the steps of:

comparing the raw data currently obtained with the raw data previously obtained, and obtaining all file paths which have been changed;

checking all the file paths that have been changed to determine whether they reflect expected writing actions; and for the file paths not reflecting expected writing actions, detecting them as abnormal (unexpected) writing.

14. The method as claimed in claim 11, wherein the storage device is flash memory.

* * * * *